(12) United States Patent  
Ohmori (10) Patent No.: US 8,046,618 B2  
(45) Date of Patent: Oct. 25, 2011

(54) SEMICONDUCTOR CHIP OPERATING WITH MINIMAL POWER CONSUMPTION

(75) Inventor: Mutsuhiro Ohmori, Kanagawa (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/292,310

(22) Filed: Nov. 17, 2008

(65) Prior Publication Data

US 2009/0150651 A1  Jun. 11, 2009

(30) Foreign Application Priority Data

Dec. 7, 2007 (JP) .................................. 2007-316938

(51) Int. Cl.  
*G06F 1/32* (2006.01)

(52) U.S. Cl. .......................... 713/324; 713/320; 713/323

(58) Field of Classification Search .................. 713/320, 713/323, 324  
See application file for complete search history.

(56) References Cited

U.S. PATENT DOCUMENTS

| | | | |
|---|---|---|---|
| 6,789,207 | B1 | 9/2004 | Maejima |
| 6,990,029 | B2 | 1/2006 | Hardee |
| 7,051,221 | B2 * | 5/2006 | Clabes et al. ................. 713/320 |
| 2007/0255929 | A1 | 11/2007 | Kasahara et al. |
| 2009/0070609 | A1 * | 3/2009 | Kahle et al. .................... 713/320 |

FOREIGN PATENT DOCUMENTS

| | | |
|---|---|---|
| JP | 2002-032218 A | 1/2002 |
| JP | 2006-293768 A | 10/2006 |
| JP | 3899092 | 1/2007 |
| WO | WO-00/02118 A1 | 1/2000 |

OTHER PUBLICATIONS

Japanese Office Action issued Nov. 17, 2009 for corresponding Japanese Application No. 2007-316938.  
Hayashi, "Memory architecture of the next generation chip multiprocessor" [online] Jul. 25, 2007, NGArch (Next Generation Architecture) Forum 2007, Document for meeting presentation, Kyushu University, pp. 1 to 17, <https://qir.kyushu-u.ac.jp/dspace/bitstream/2324/9165/1/NGArch2007hayashi.pdf>.  
"Memory Architecture for Next-Generation Chip Multiprocessors", NGArch (Next Generation Architecture) Forum 2007.  
Japanese Office Action issued Oct. 12, 2010 for corresponding Japanese Application No. 2007-316938.

* cited by examiner

*Primary Examiner* — Glenn A Auve  
(74) *Attorney, Agent, or Firm* — Rader, Fishman & Grauer PLLC (57) ABSTRACT

Disclosed herein is a semiconductor chip including: a plurality of processing devices that can communicate with each other; wherein each of the processing devices includes an arithmetic unit, an individual memory connected to the arithmetic unit on a one-to-one basis, and a control unit configured to independently control turning on and off of operation of the arithmetic unit and the individual memory.

11 Claims, 6 Drawing Sheets

FIG. 1A — BOTH OF PE-a AND PE-b OPERATE

FIG. 1B — ONLY PE-a OPERATES

FIG. 1C — PE-a OPERATES AND USES LS OF PE-b (CORE OF PE-b IS NOT USED BUT POWER TO CORE OF PE-b IS ON)

| AAA | POWER OFF |
| AAA | POWER ON AND UNUSED |
| AAA | POWER ON AND USED |

FIG. 2A  BOTH OF PE-a AND PE-b OPERATE

FIG. 2B  ONLY PE-a OPERATES

FIG. 2C  PE-a OPERATES AND USES LS OF PE-b

FIG. 6

SEMICONDUCTOR CHIP OPERATING WITH MINIMAL POWER CONSUMPTION

CROSS REFERENCES TO RELATED APPLICATIONS

The present invention contains subject matter related to Japanese Patent Application JP 2007-316938 filed in the Japan Patent Office on Dec. 7, 2007, the entire contents of which being incorporated herein by reference.

BACKGROUND OF THE INVENTION

1. Field of the Invention

The present invention relates to a semiconductor chip including a plurality of processing devices such as processor elements or the like.

2. Description of the Related Art

A semiconductor chip including a plurality of identical processor elements (Processing Elements: PE) is known.

Each PE includes an arithmetic unit (core), an individual memory (LS: Local Storage) connected to the core on a one-to-one basis, and a communication unit (COM) for performing communication with another PE.

Techniques of using the individual memory (LS) of an unused core between PEs, or lending and borrowing the LS of a core between PEs in such a semiconductor system are proposed (see "NGARC Forum 2007 Kyushu University, Memory Architecture of Next-Generation Multiprocessor," for example).

In addition, techniques of turning off power to the whole of a PE by a power gate (PG) are known (see Japanese Patent No. 3899092, for example).

Figure 1A:
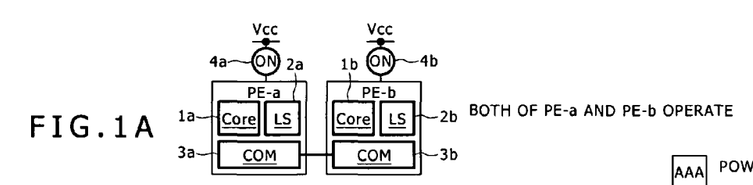
FIGS. 1A, 1B, and 1C are diagrams showing an example of a configuration when the techniques of a power gate are applied to the proposed techniques of lending and borrowing the LS of a core between PEs.
Figure 1B:
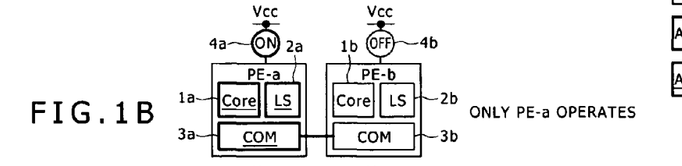
Figure 1C:
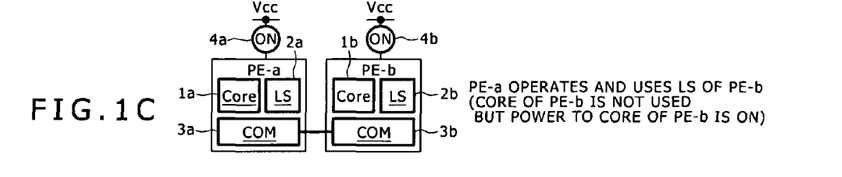

FIGS. 1A, 1B, and 1C are diagrams showing an example of a configuration when the techniques of a power gate are applied to the proposed techniques of lending and borrowing the LS of a core between PEs.

In the example of FIG. 1, two PEs, that is, a PE-a and a PE-b are connected to a power supply potential Vcc and configured such that an LS can be lent and borrowed between the PE-a and the PE-b.

The PE-a includes a core 1$a$, an LS 2$a$ of the core 1$a$, and a communication unit (COM) 3$a$. Then, the PE-a has a power control unit 4$a$ formed by a power gate that is connected between the power supply terminal of the PE-a as a whole and the power supply potential Vcc and which can turn on and off the power supply line.

The PE-b includes a core 1$b$, an LS 2$b$ of the core 1$b$, and a communication unit (COM) 3$b$. Then, the PE-b has a power control unit 4$b$ formed by a power gate that is connected between the power supply terminal of the PE-b as a whole and the power supply potential Vcc and which can turn on and off the power supply line.

The communication unit 3$a$ of the PE-a and the communication unit 3$b$ of the PE-b are connected to each other.

As shown in FIG. 1A, when both of the PE-a and the PE-b are operated, the PE-a and the PE-b are both maintained in an on state (operating state) by the power control units 4$a$ and 4$b$.

As shown in FIG. 1B, when only the PE-a is operated, the PE-a is maintained in the on state (operating state) by the power control unit 4$a$, and the PE-b is maintained in an off state (non-operating state) by the power control unit 4$b$.

As shown in FIG. 1C, when the PE-a operates and the PE-a uses the LS 2$b$ of the PE-b, that is, the PE-a borrows the LS 2$b$ of the PE-b (the PE-b lends the LS 2$b$ to the PE-a), the PE-a and the PE-b are both maintained in the on state by the power control units 4$a$ and 4$b$.

SUMMARY OF THE INVENTION

In the above-described techniques, however, when the PE-a operates and uses the LS 2$b$ of the PE-b, even though the core 1$b$ of the PE-b is not used, the PE-a and the PE-b are both maintained in the on state by the power control units 4$a$ and 4$b$, and the core 1$b$ is supplied with power.

The constitution of FIG. 1 consequently has a disadvantage of having difficulty in operating with a minimum necessary power consumption and wasting power.

It is desirable to provide a semiconductor chip that can suppress unnecessary power consumption and operate with a minimum necessary power consumption.

According to a first embodiment of the present invention, there is provided a semiconductor chip including: a plurality of processing devices that can communicate with each other; wherein each of the processing devices includes an arithmetic unit, an individual memory connected to the arithmetic unit on a one-to-one basis, and a control unit configured to independently control turning on and off of operation of the arithmetic unit and the individual memory.

Preferably, each of the processing devices has a communication unit enabling communication with another processing device, and the communication unit is controlled to be on when the individual memory is on, and is controlled to be off when the individual memory is off.

Preferably, the control unit independently controls supply of power to the arithmetic unit and the individual memory.

Preferably, the control unit independently controls supply of a clock to the arithmetic unit and the individual memory.

Preferably, the individual memory is divided into a plurality of individual memories, and the control unit independently controls supply of power to the plurality of divided individual memories.

Preferably, the individual memory is divided into a plurality of individual memories, and the control unit independently controls supply of a clock to the plurality of divided individual memories.

Preferably, each of the processing devices has a communication unit enabling communication with another processing device, the communication unit is controlled to be on when the individual memory is on, and is controlled to be off when the individual memory is off, and the control unit includes a plurality of transistors connected between a power supply potential and respective power supply terminals of the arithmetic unit, the divided individual memories, and the communication unit, a gate of each of the plurality of transistors being supplied with a signal controlling turning on and off of the transistor, and a power gate control unit configured to independently control turning on and off of the plurality of transistors according to a control signal.

Preferably, each of the processing devices has a communication unit enabling communication with another processing device, the communication unit is controlled to be on when the individual memory is on, and is controlled to be off when the individual memory is off, and the control unit includes a plurality of gates connected between a power supply potential and respective clock terminals of the arithmetic unit, the divided individual memories, and the communication unit, the plurality of gates each being supplied with a signal that controls passage of the clock, and a gate control unit configured to independently control the plurality of gates according to a control signal.

According to a second embodiment of the present invention, there is provided a semiconductor chip including: a plurality of processing devices that can communicate with each other; a main processing device configured to supply each of the processing devices with a control signal for performing control according to a role allotted to each of the processing devices; and a bus for connecting the plurality of processing devices to an external part; wherein each of the processing devices includes an arithmetic unit, an individual memory connected to the arithmetic unit on a one-to-one basis, and a control unit configured to independently control turning on and off of operation involving power consumption of the arithmetic unit and the individual memory according to a control signal supplied by the main processing device.

According to the embodiments of the present invention, each of the plurality of processing devices in the semiconductor chip has an individual memory connected to an arithmetic unit on a one-to-one basis. In each of the processing devices, turning on and off of operation involving power consumption of the arithmetic unit and the individual memory is controlled individually.

According to the embodiments of the present invention, it is possible to suppress unnecessary power consumption, and perform operation with a minimum necessary power consumption.

DETAILED DESCRIPTION OF THE PREFERRED EMBODIMENTS

Preferred embodiments of the present invention will hereinafter be described with reference to the drawings.

Figure 2A:
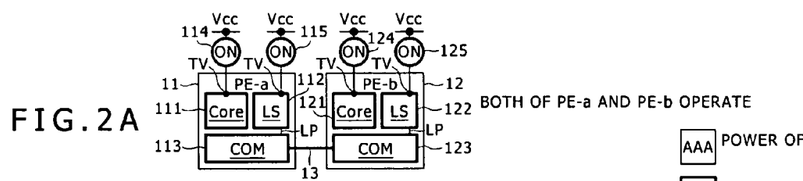
FIGS. 2A, 2B, and 2C are diagrams showing an outline of a basic configuration of a semiconductor chip according to an embodiment of the present invention.
Figure 2B:
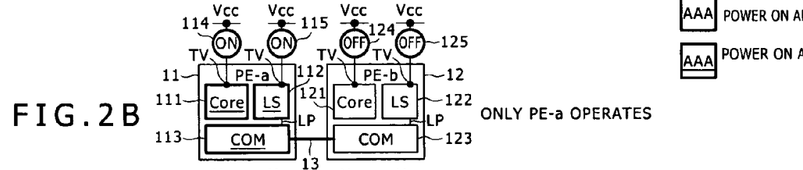
Figure 2C:
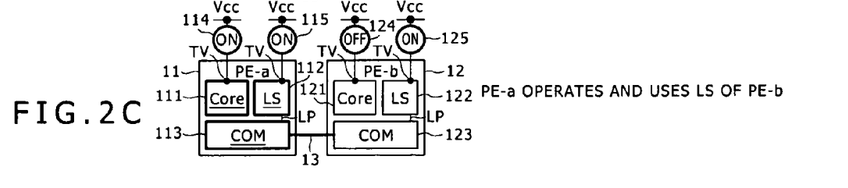

FIGS. 2A to 2C are diagrams showing an outline of a basic configuration of a semiconductor chip according to an embodiment of the present invention.

Description in the following will be made of a case of two PEs. A structure is supposed in which two PEs, that is, PE-a and PE-b are connected to each other by communication units (COM).

The semiconductor chip 10 in FIGS. 2A to 2C is configured such that two PEs 11 (PE-a) and 12 (PE-b) can lend and borrow an LS (individual memory) to and from each other.

The PE 11 (PE-a) includes a core 111, an LS 112 of the core 111, and a communication unit (COM) 113. Then, the PE 11 (PE-a) has a power control unit 114 formed by a power gate that is connected between the power supply terminal TV of the core 111 in the PE 11 (PE-a) and a power supply potential Vcc and which can turn on and off the power supply line, and a power control unit 115 formed by a power gate that is connected between the power supply terminal TV of the LS 112 and the power supply potential Vcc and which can turn on and off the power supply line.

Incidentally, the communication unit (COM) 113 is formed so as to be supplied with power by the LS 112 via a power line LP. Hence, when the power control unit 115 is on, the LS 112 and the communication unit (COM) 113 are supplied with power. When the power control unit 115 is off, on the other hand, the LS 112 and the communication unit (COM) 113 are not supplied with power.

The PE 12 (PE-b) includes a core 121, an LS 122 of the core 121, and a communication unit (COM) 123. Then, the PE 12 (PE-b) has a power control unit 124 formed by a power gate that is connected between the power supply terminal TV of the core 121 in the PE 12 (PE-b) and the power supply potential Vcc and which can turn on and off the power supply line, and a power control unit 125 formed by a power gate that is connected between the power supply terminal TV of the LS 122 and the power supply potential Vcc and which can turn on and off the power supply line.

Incidentally, the communication unit (COM) 123 is formed so as to be supplied with power by the LS 122 via a power line LP. Hence, when the power control unit 125 is on, the LS 122 and the communication unit (COM) 123 are supplied with power. When the power control unit 125 is off, on the other hand, the LS 122 and the communication unit (COM) 123 are not supplied with power.

The communication unit 113 of the PE 11 (PE-a) and the communication unit 123 of the PE 12 (PE-b) are connected to each other by a bus 13.

As shown in FIG. 2A, when both of the PE 11 (PE-a) and the PE 12 (PE-b) are operated, all the elements of the core 111, the LS 112, and the communication unit 113 of the PE 11 (PE-a) and the core 121, the LS 122, and the communication unit 123 of the PE 12 (PE-b) are maintained in an on state by the power control units 114, 115, 124, and 125.

As shown in FIG. 2B, when only the PE 11 (PE-a) is operated, all the elements of the core 111, the LS 112, and the communication unit 113 of the PE 11 (PE-a) are maintained in an on state by the power control units 114 and 115. On the other hand, all the elements of the core 121, the LS 122, and the communication unit 123 of the PE 12 (PE-b) are maintained in an off state by the power control units 124 and 125.

As shown in FIG. 2C, in a case where the PE 11 (PE-a) operates and the PE 11 (PE-a) uses the LS 122 of the PE 12 (PE-b), that is, the PE 11 (PE-a) borrows the LS 122 of the PE 12 (PE-b) (the PE 12 (PE-b) lends the LS 122 to the PE 11 (PE-a)) when the capacity of the LS 112 of the PE 11 (PE-a) alone is not sufficient, for example, power control is performed as follows.

All the elements of the core 111, the LS 112, and the communication unit 113 of the PE 11 (PE-a) are maintained in an on state by the power control units 114 and 115.

On the other hand, in the PE 12 (PE-b), the core 121 is maintained in an off state by the power control unit 124, and the LS 122 and the communication unit 123 are maintained in an on state by the power control unit 125.

Thus, when an LS (individual memory) is lent and borrowed, power to the core not being operated can be turned off, whereby the power consumption of the part of the core can be reduced. Therefore operation with a minimum necessary power consumption is made possible.

Incidentally, when a larger number of PEs are implemented, and also when an LS in a PE that is not made to perform arithmetic processing which PE is set as a memory common to each PE is used, power consumption can be lowered by not supplying power to the core of the PE whose LS is used.

The above description has been made of a case where a core and an LS are subjected to on/off control independently of each other by a power gate. However, a core and an LS can be subjected to on/off control independently of each other by a clock gate, for example.

Description will next be made of a general configuration of a semiconductor chip including a plurality of PEs having the configuration shown in FIGS. 2A to 2C and an example of supply of gate control signals.

Figure 3:
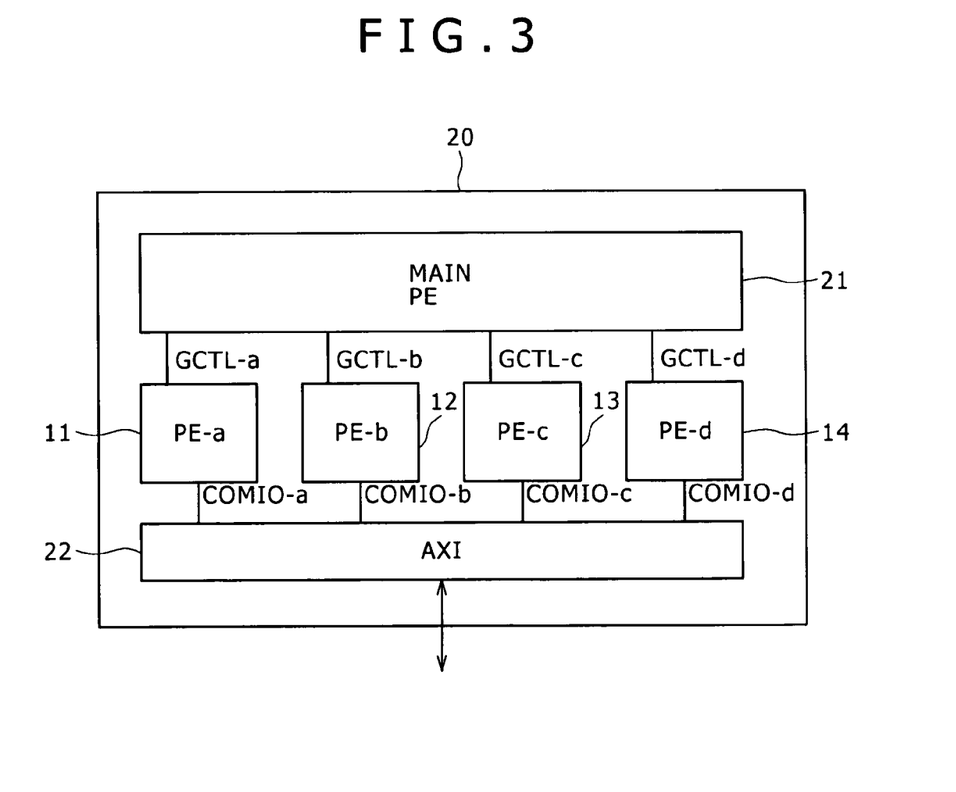
FIG. 3 is a diagram showing a general configuration of a semiconductor chip according to the present embodiment and a state of supply of a gate control signal to each PE.

FIG. 3 is a diagram showing a general configuration of a semiconductor chip according to the present embodiment and a state of supply of a gate control signal to each PE.

The semiconductor chip 20 includes a main PE (Main PE) 21, a plurality of PEs (four PEs in FIG. 3) 11 (PE-a), 12 (PE-b), 13 (PE-c), and 14 (PE-d) that can lend and borrow an LS (individual memory), and an AXI (Advanced extensible Interface) bus 22.

Incidentally, in FIG. 3, the PEs that can lend and borrow an LS (individual memory) are identified by similar references to those of FIGS. 2A to 2C to facilitate understanding.

In the semiconductor chip 20 of FIG. 3, the PEs 11 (PE-a), 12 (PE-b), 13 (PE-c), and 14 (PE-d) are supplied with respective gate control signals GCTL-a, GCTL-b, GCTL-c, and GCTL-d from the main PE 21.

The main PE 21 performs power control according to roles allotted to the respective PEs 11 (PE-a), 12 (PE-b), 13 (PE-c), and 14 (PE-d).

The programs and data interfaces COMIO-a, COMIO-b, COMIO-c, and COMIO-d of the respective PEs 11 (PE-a), 12 (PE-b), 13 (PE-c), and 14 (PE-d) are connected to the AXI bus 22, whereby a communication path of communication of the semiconductor chip 20 with an outside is secured.

Figure 4:
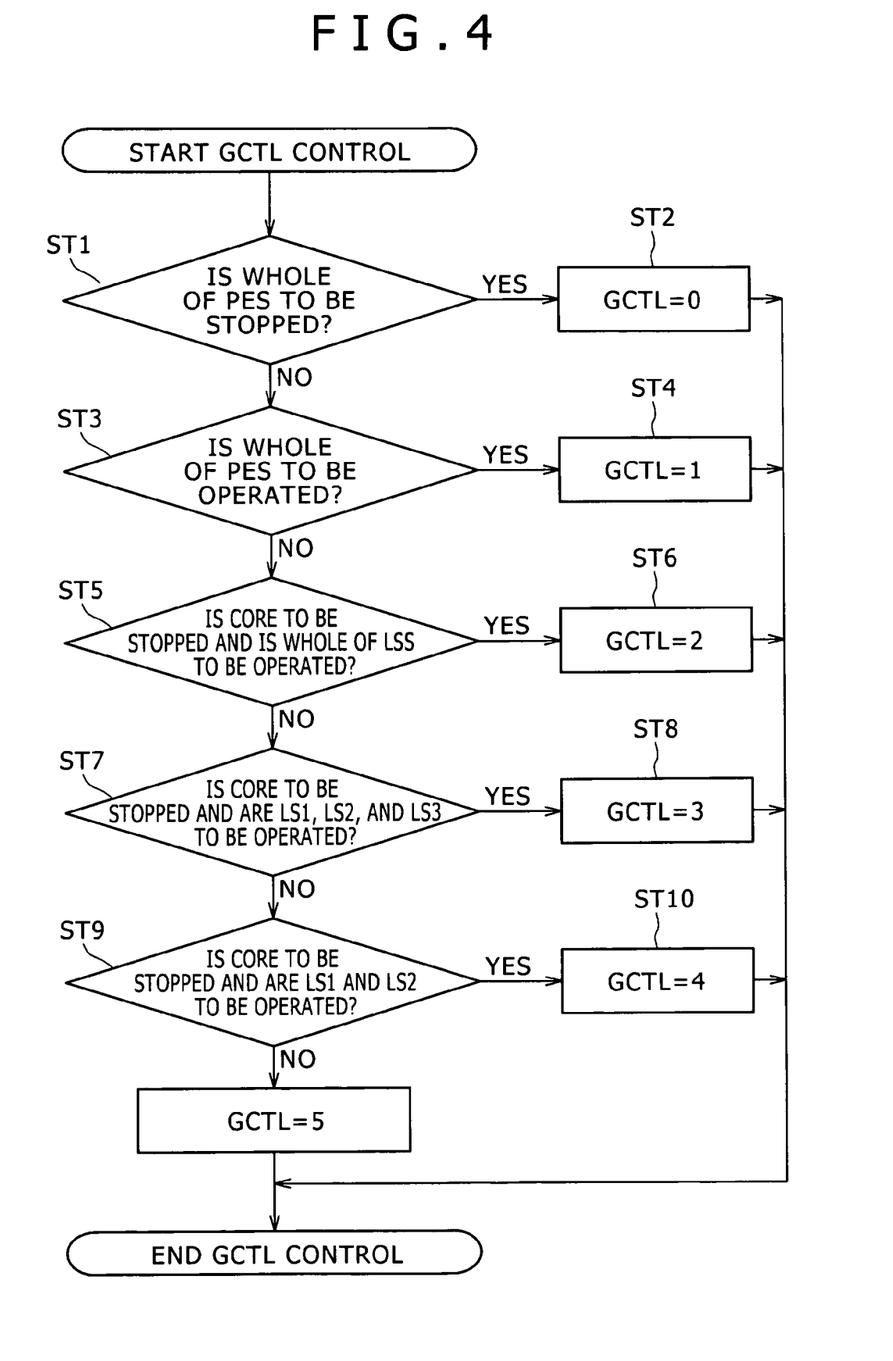
FIG. 4 is a chart of a procedure for determining the value of the gate control signal GCTL supplied from a main PE to each PE.

FIG. 4 is a chart of a procedure for determining the value of the gate control signal GCTL supplied from the main PE to each PE.

This procedure may be performed by either of software control and hardware control, and can be implemented by a program in the main PE or the like.

At a start of GCTL control, whether there is a request to stop the whole of the PEs is first determined (ST1). When a result of the determination is Yes, a setting is made such that GCTL=0, and then the process is ended (ST2).

When it is determined in step ST1 that the request is not a request to stop the whole of the PEs, the process proceeds to a next step to determine whether the request is a request to operate the whole of the PEs (ST3). When a result of the determination is Yes, a setting is made such that GCTL=1, and then the process is ended (ST4).

When it is determined in step ST3 that the request is not a request to operate the whole of the PEs, whether the request is a request to operate the whole of the LSs is determined (ST5). When a result of the determination is Yes, a setting is made such that GCTL=2, and then the process is ended (ST6).

When it is determined in step ST5 that the request is not a request to operate the whole of the LSs, the process proceeds to a next step to determine whether the request is a request to operate the LS1, the LS2, and the LS3 (ST7). When a result of the determination is Yes, a setting is made such that GCTL=3, and then the process is ended (ST8).

When it is determined in step ST7 that the request is not a request to operate the LS1, the LS2, and the LS3, the process proceeds to a next step to determine whether the request is a request to operate the LS1 and the LS2 (ST9). When a result of the determination is Yes, a setting is made such that GCTL=4, and then the process is ended (ST10).

When it is determined in step ST9 that the request is not a request to operate the LS1 and the LS2, the process proceeds to a next step, where a setting is made such that GCTL=5, and then the process is ended (ST11).

With the configuration and the procedure described above, when an LS area is enlarged or an LS is used as a memory shared between PEs, it is possible to turn off power or a clock to a core not used in a PE, rather than turning on and off power or a clock to the whole of the PEs.

An example of implementation of a power gate and a clock gate in the present embodiment will be described below.

Figure 5:
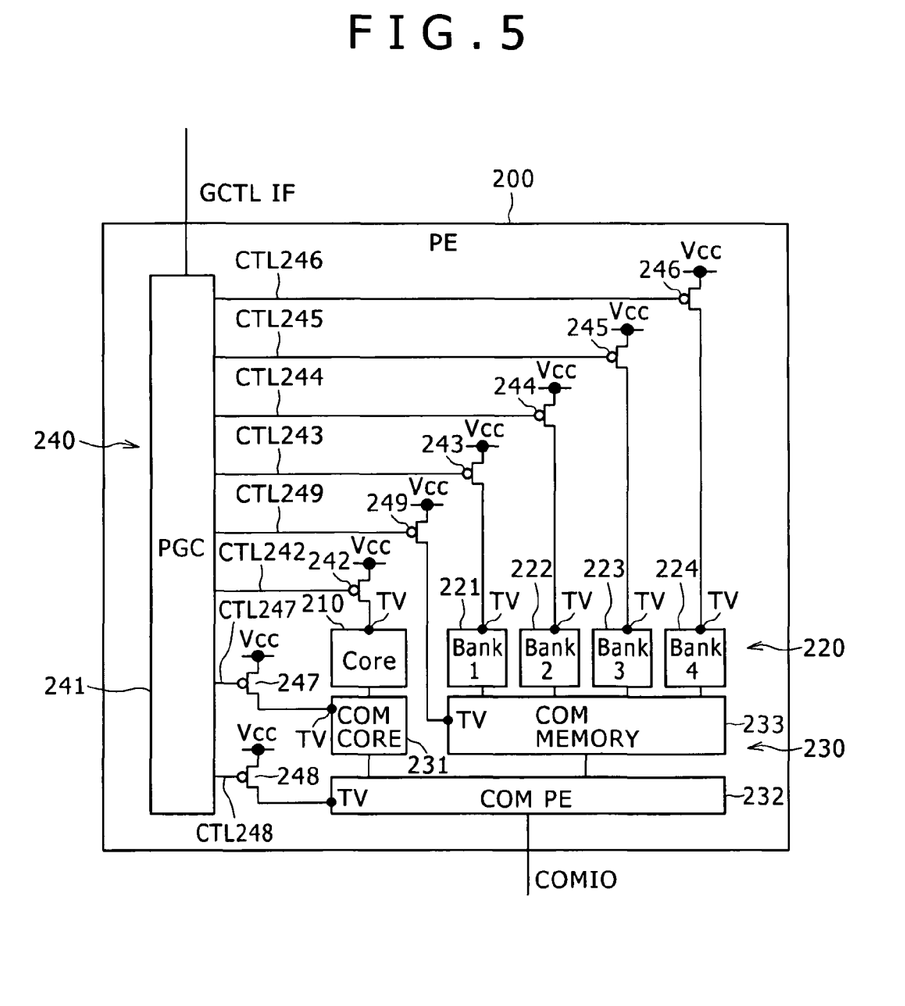
FIG. 5 is a diagram showing an example of implementation of a power gate in each PE of the semiconductor chip according to the present embodiment.

FIG. 5 is a diagram showing an example of implementation of a power gate in each PE of the semiconductor chip according to the present embodiment.

In FIG. 5, a PE is identified by reference numeral 200.

The PE 200 in FIG. 5 includes a core 210, an LS 220, a communication unit 230, and a power gate control unit 240.

In the example of FIG. 5, the LS 220 is divided into four banks 221, 222, 223, and 224.

The communication unit 230 includes a communication unit core (COM CORE) 231, a communication unit PE (COM PE) 232, and a communication unit memory (COM MEMORY) 233.

The power gate control unit 240 includes a power gate control block (PGC block) 241 and p-channel MOS (PMOS) transistors 242 to 249 whose sources are connected to a power supply potential Vcc and whose drains are connected to the power supply terminal TV of the core 210, the respective power supply terminals TV of the four banks 221, 222, 223, and 224, and the respective power supply terminals TV of the communication unit core (COM CORE) 231, the communication unit PE (COM PE) 232, and the communication unit memory (COM MEMORY) 233, the core 210, the banks 221, 222, 223, and 224, the communication unit core (COM CORE) 231, the communication unit PE (COM PE) 232, and the communication unit memory (COM MEMORY) 233 each being an element block.

The gates of the PMOS transistors 242 to 249 are connected to respective gate control lines CTL 242 to CTL 249 of the PGC block 241.

FIG. 5 shows two interfaces for data of one PE.

One interface is COMIO for loading/storing a program, transferring data before operation and after the operation, and the like. The other interface is GCTLIF for controlling the power gate.

The PGC block 241 encodes an input signal (gate control signal) GCTL from GCTLIF to the PE 200, and then supplies an on/off control signal to the gates of the PMOS transistors 242 to 249, which turn on or off power supply to each block.

In a case of the gate control signal GCTL=0 in the encoding process of the PGC block 241, all gate control signals of the PGC block 241 are output at a high level, so that all the PMOS transistors 242 to 249 are turned off to stop power supply to all the blocks.

In a case of the gate control signal GCTL=1, all the gate control signals of the PGC block 241 are output at a low level, so that all the PMOS transistors 242 to 249 are turned on to supply power to all the blocks.

In a case of the gate control signal GCTL=2, the PMOS transistors 248, 249, 243 to 246 which control power to the communication unit PE (COM PE) 232, the communication unit memory (COM MEMORY) 233, and the banks 221 (Bank1), 222 (Bank2), 223 (Bank3), and 224 (Bank4) are turned on, and the PMOS transistors 242 and 247 which control power to the communication unit core (COM CORE)

231 and the core (CORE) 210 are turned off. Thus, the LSs of the banks 221 to 224 are usable, and unnecessary power to the core (CORE) 210 and the like is cut off.

In a case of the gate control signal GCTL=3, the PMOS transistors 248, 249, 243 to 245 which control power to the communication unit PE (COM PE) 232, the communication unit memory (COM MEMORY) 233, and the banks 221 (Bank1), 222 (Bank2), and 223 (Bank3) are turned on, and the PMOS transistors 242, 247, and 246 which control power to the communication unit core (COM CORE) 231, the core (CORE) 210, and the bank 224 (Bank4) are turned off. Thus, the LSs of the banks 221 to 223 are usable, and unnecessary power to the core (CORE) 210 and the like is cut off.

In a case of the gate control signal GCTL=4, the PMOS transistors 248, 249, 243, and 244 which control power to the communication unit PE (COM PE) 232, the communication unit memory (COM MEMORY) 233, and the banks 221 (Bank1) and 222 (Bank2) are turned on, and the PMOS transistors 242, 247, 245, and 246 which control power to the communication unit core (COM CORE) 231, the core (CORE) 210, and the banks 223 (Bank3) and 224 (Bank4) are turned off. Thus, the LSs of the banks 221 and 222 are usable, and unnecessary power to the core (CORE) 210 and the like is cut off.

In a case of the gate control signal GCTL=5, the PMOS transistors 248, 249, and 243 which control power to the communication unit PE (COM PE) 232, the communication unit memory (COM MEMORY) 233, and the bank 221 (Bank1) are turned on, and the PMOS transistors 242, 247, and 244 to 246 which control power to the communication unit core (COM CORE) 231, the core (CORE) 210, and the banks 222 (Bank2), 223 (Bank3), and 224 (Bank4) are turned off. Thus, the LS of the bank 221 is usable, and unnecessary power to the core (CORE) 210 and the like is cut off.

An example of implementation of a clock gate will next be described.

Figure 6:
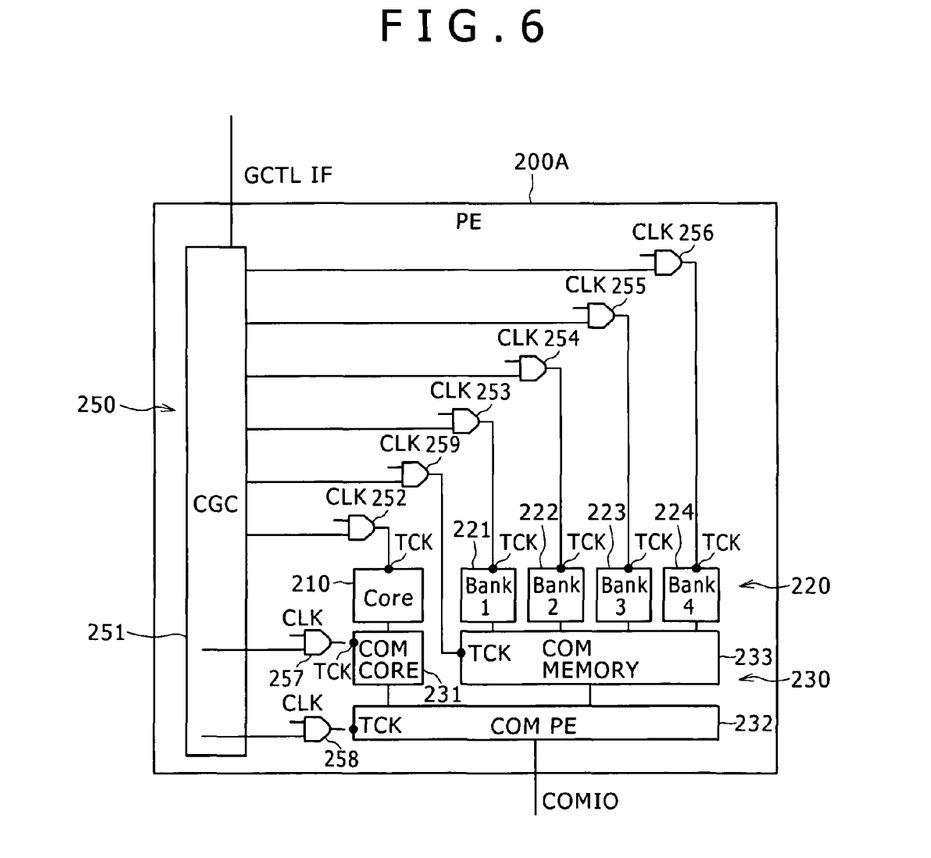
FIG. 6 is a diagram showing an example of implementation of a clock gate in each PE of the semiconductor chip according to the present embodiment.

FIG. 6 is a diagram showing an example of implementation of a clock gate in each PE of the semiconductor chip according to the present embodiment.

A PE 200A in FIG. 6 is different from the PE 200 in FIG. 5 in that a clock gate control unit 250 is provided in place of the power gate control unit, a clock gate control block (CGC block) 251 is disposed in place of the PGC block 241, and two-input AND gates 252 to 259 are arranged in place of the PMOS transistors 242 to 249. The outputs of the AND gates 252 to 259 are respectively connected to the clock terminal TCK of a core 210, the respective clock terminals TCK of four banks 221, 222, 223, and 224, and the respective clock terminals TCK of a communication unit core (COM CORE) 231, a communication unit PE (COM PE) 232, and a communication unit memory (COM MEMORY) 233, the core 210, the banks 221, 222, 223, and 224, the communication unit core (COM CORE) 231, the communication unit PE (COM PE) 232, and the communication unit memory (COM MEMORY) 233 each being an element block.

The CGC block 251 encodes an input signal (gate control signal) GCTL from GCTLIF to the PE 200A, and then supplies an on/off control signal to the gates of the AND gates 252 to 259, which turn on or off supply of a clock CLK to each block.

In a case of the gate control signal GCTL=0 in the encoding process of the CGC block 251, all clock control signals of the CGC block 251 are output at a low level, so that the outputs of all the AND gates 252 to 259 are set to a low level to stop the clock supply to all the blocks.

In a case of the gate control signal GCTL=1, all the clock control signals are output at a high level, so that the outputs of all the AND gates 252 to 259 pass the clock CLK as it is to supply the clock CLK to all the blocks.

In a case of the gate control signal GCTL=2, inputs of the AND gates 258, 259, 253 to 256 which perform clock control on the communication unit PE (COM PE) 232, the communication unit memory (COM MEMORY) 233, and the banks 221 (Bank1), 222 (Bank2), 223 (Bank3), and 224 (Bank4) are set to a high level to supply the clock CLK, and inputs of the AND gates 252 and 257 which perform clock control on the communication unit core (COM CORE) 231 and the core (CORE) 210 are set to a low level to stop supplying the clock CLK. Thus, the LSs of the banks 221 to 224 are usable, and unnecessary power to the core (CORE) 210 and the like is cut off.

In a case of the gate control signal GCTL=3, the inputs of the AND gates 258, 259, 253 to 255 which perform clock control on the communication unit PE (COM PE) 232, the communication unit memory (COM MEMORY) 233, and the banks 221 (Bank1), 222 (Bank2), and 223 (Bank3) are set to a high level to supply the clock CLK, and the inputs of the AND gates 252, 257, and 256 which perform clock control on the communication unit core (COM CORE) 231, the core (CORE) 210, and the bank 224 (Bank4) are set to a low level to stop supplying the clock CLK. Thus, the LSs of the banks 221 to 223 are usable, and unnecessary power to the core (CORE) 210 and the like is cut off.

In a case of the gate control signal GCTL=4, the inputs of the AND gates 258, 259, 253, and 254 which perform clock control on the communication unit PE (COM PE) 232, the communication unit memory (COM MEMORY) 233, and the banks 221 (Bank1) and 222 (Bank2) are set to a high level to supply the clock CLK, and the inputs of the AND gates 252, 257, 255, and 256 which perform clock control on the communication unit core (COM CORE) 231, the core (CORE) 210, and the banks 223 (Bank3) and 224 (Bank4) are set to a low level to stop supplying the clock CLK. Thus, the LSs of the banks 221 and 222 are usable, and unnecessary power to the core (CORE) 210 and the like is cut off.

In a case of the gate control signal GCTL=5, the inputs of the AND gates 258, 259, and 253 which perform clock control on the communication unit PE (COM PE) 232, the communication unit memory (COM MEMORY) 233, and the bank 221 (Bank1) are set to a high level to supply the clock CLK, and the inputs of the AND gates 252, 257, and 254 to 256 which perform clock control on the communication unit core (COM CORE) 231, the core (CORE) 210, and the banks 222 (Bank2), 223 (Bank3), and 224 (Bank4) are set to a low level to stop supplying the clock CLK. Thus, the LS of the bank 221 is usable, and unnecessary power to the core (CORE) 210 and the like is cut off.

Because the semiconductor chip according to the present embodiment has the configuration as described above, the semiconductor chip according to the present embodiment can realize the following effects.

Power to a core not being operated when an LS (individual memory) is lent and borrowed can be turned off, whereby the power consumption of the part of the core can be reduced. Therefore operation with a minimum necessary power consumption is made possible.

Power control is performed on each of LSs divided in banks, whereby only a minimum of LSs are operated according to necessary LS size. Thus operation with a minimum necessary power consumption is made possible.

It should be understood by those skilled in the art that various modifications, combinations, sub-combinations and alterations may occur depending on design requirements and other factors insofar as they are within the scope of the appended claims or the equivalents thereof.

What is claimed is:

1. A semiconductor chip comprising:
   a plurality of processing devices that can communicate with each other;
   wherein each of said processing devices includes
   an arithmetic unit,
   an individual memory connected to said arithmetic unit on a one-to-one basis, and
   a plurality of control units configured to independently control turning on and off of operation of said arithmetic unit and said individual memory, wherein the plurality of control units are separately connected to said arithmetic unit and said individual memory.

2. The semiconductor chip according to claim 1,
   wherein each of said processing devices has a communication unit enabling communication with another processing device, and
   said communication unit is controlled to be on when said individual memory is on, and is controlled to be off when said individual memory is off.

3. The semiconductor chip according to claim 1,
   wherein said plurality of control units independently controls supply of power to said arithmetic unit and said individual memory.

4. The semiconductor chip according to claim 3,
   wherein said individual memory is divided into a plurality of individual memories, and
   said plurality of control units independently controls supply of power to the plurality of divided individual memories.

5. The semiconductor chip according to claim 4,
   wherein each of said processing devices has a communication unit enabling communication with another processing device, and
   said communication unit is controlled to be on when said individual memory is on, and is controlled to be off when said individual memory is off.

6. The semiconductor chip according to claim 5,
   wherein said plurality of control units includes
   a plurality of transistors connected between a power supply potential and respective power supply terminals of said arithmetic unit, said divided individual memories, and said communication unit, a gate of each of the plurality of transistors being supplied with a signal controlling turning on and off of the transistor, and
   a power gate control unit configured to independently control turning on and off of said plurality of transistors according to a control signal.

7. The semiconductor chip according to claim 1,
   wherein said plurality of control units independently controls supply of a clock to said arithmetic unit and said individual memory.

8. The semiconductor chip according to claim 7,
   wherein said individual memory is divided into a plurality of individual memories, and
   said plurality of control units independently controls supply of the clock to the plurality of divided individual memories.

9. The semiconductor chip according to claim 8,
   wherein each of said processing devices has a communication unit enabling communication with another processing device, and
   said communication unit is controlled to be on when said individual memory is on, and is controlled to be off when said individual memory is off.

10. The semiconductor chip according to claim 9,
    wherein said plurality of control units includes
    a plurality of gates connected between a power supply potential and respective clock terminals of said arithmetic unit, said divided individual memories, and said communication unit, the plurality of gates each being supplied with a signal that controls passage of the clock, and
    a gate control unit configured to independently control said plurality of gates according to a control signal.

11. A semiconductor chip comprising:
    a plurality of processing devices that can communicate with each other;
    a main processing device configured to supply each of said processing devices with a control signal for performing control according to a role allotted to each of said processing devices; and
    a bus for connecting said plurality of processing devices to an external part;
    wherein each of said processing devices includes
    an arithmetic unit,
    an individual memory connected to said arithmetic unit on a one-to-one basis, and
    a plurality of control units configured to independently control turning on and off of operation involving power consumption of said arithmetic unit and said individual memory according to a control signal supplied by said main processing device, wherein the plurality of control units are separately connected to said arithmetic unit and said individual memory.

* * * * *